Figure 1:
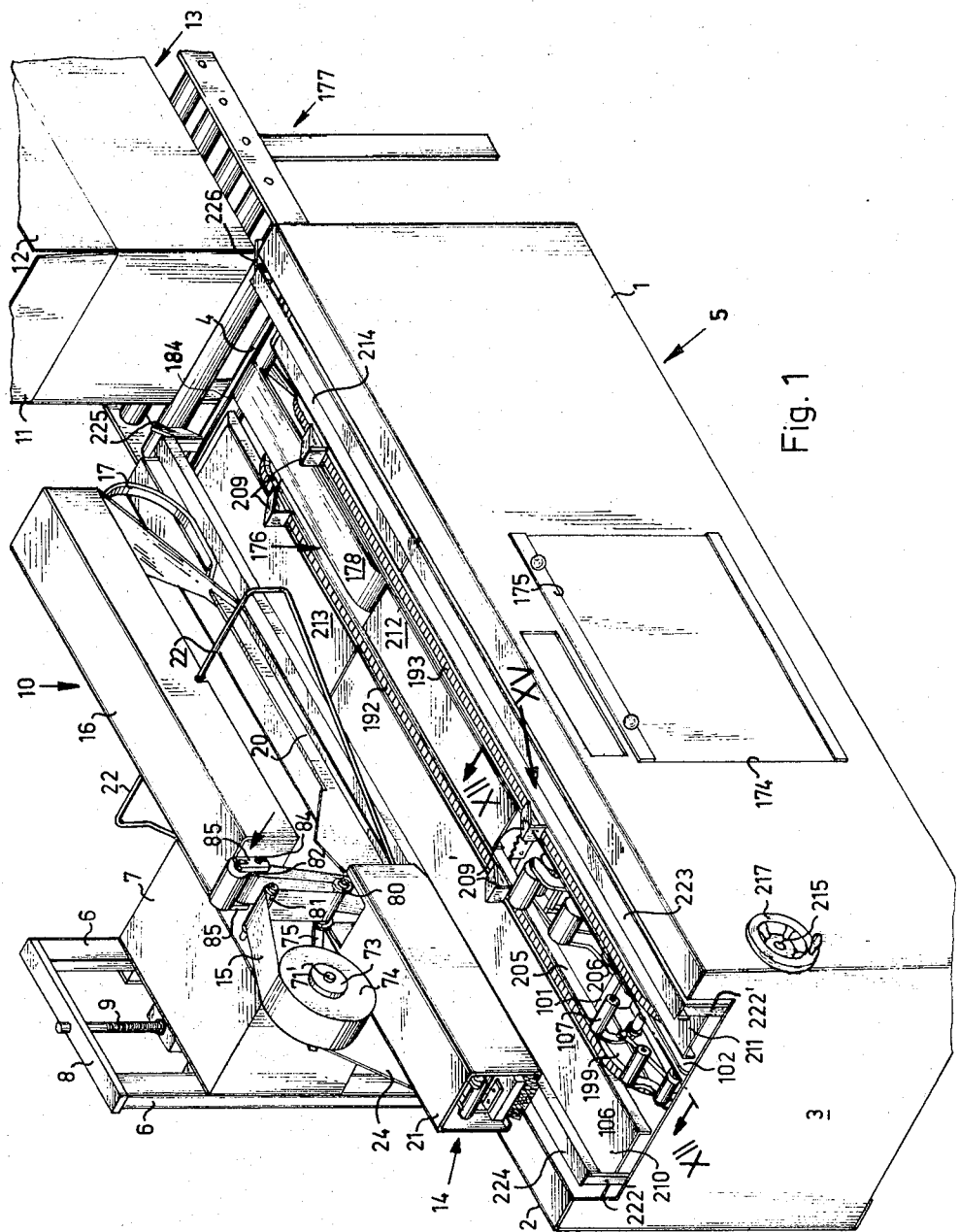

United States Patent [19]
Bartelheimer

[11] 3,800,679
[45] Apr. 2, 1974

[54] MACHINE FOR SEALING FOLDING CARTONS WITH ADHESIVE TAPE STRIPS

[75] Inventor: Ehrhard Bartelheimer, Vorm Sonnenbrink, Germany

[73] Assignee: Kochs Adler AG, Bielefeld, Germany

[22] Filed: June 2, 1972

[21] Appl. No.: 259,021

[30] Foreign Application Priority Data
June 6, 1971  Germany.......................... 2127965

[52] U.S. Cl.................... 93/36.9, 156/363, 156/522
[51] Int. Cl.............................................. B31b 1/60
[58] Field of Search........ 93/36.9; 53/137; 156/522, 156/363

[56] References Cited
UNITED STATES PATENTS

| | | | |
|---|---|---|---|
| 3,045,402 | 7/1962 | Keely et al..................... | 93/36.9 UX |
| 2,372,780 | 4/1945 | Hess.............................. | 93/36.9 X |
| 3,505,774 | 4/1970 | Gidge............................. | 93/36.9 UX |
| 3,199,262 | 10/1965 | Miller et al.................... | 93/36.9 UX |
| 3,196,591 | 7/1965 | Guido et al..................... | 93/36.9 UX |

Primary Examiner—Roy Lake
Assistant Examiner—James F. Coan
Attorney, Agent, or Firm—Jacob L. Kollin

[57] ABSTRACT

A machine for the automatic bending of the upper flaps of cartons and sealing of the bottom and top of the latter. The machine comprises means for applying adhesive tapes to adjoining faces of the carton. Means for moistening the adhesive tapes are provided, in the form of swivel pressure rollers arranged above and below a conveyor means for the boxes. Cutting means for cutting off tape lengths of tape drawn off from tape reels are disposed in the path of travel of the tapes. A conveyor belt feeds the cartons to the machine. The machine includes means for controlling the introduction of the cartons into the machine and means for moving the cartons through the machine.

12 Claims, 21 Drawing Figures

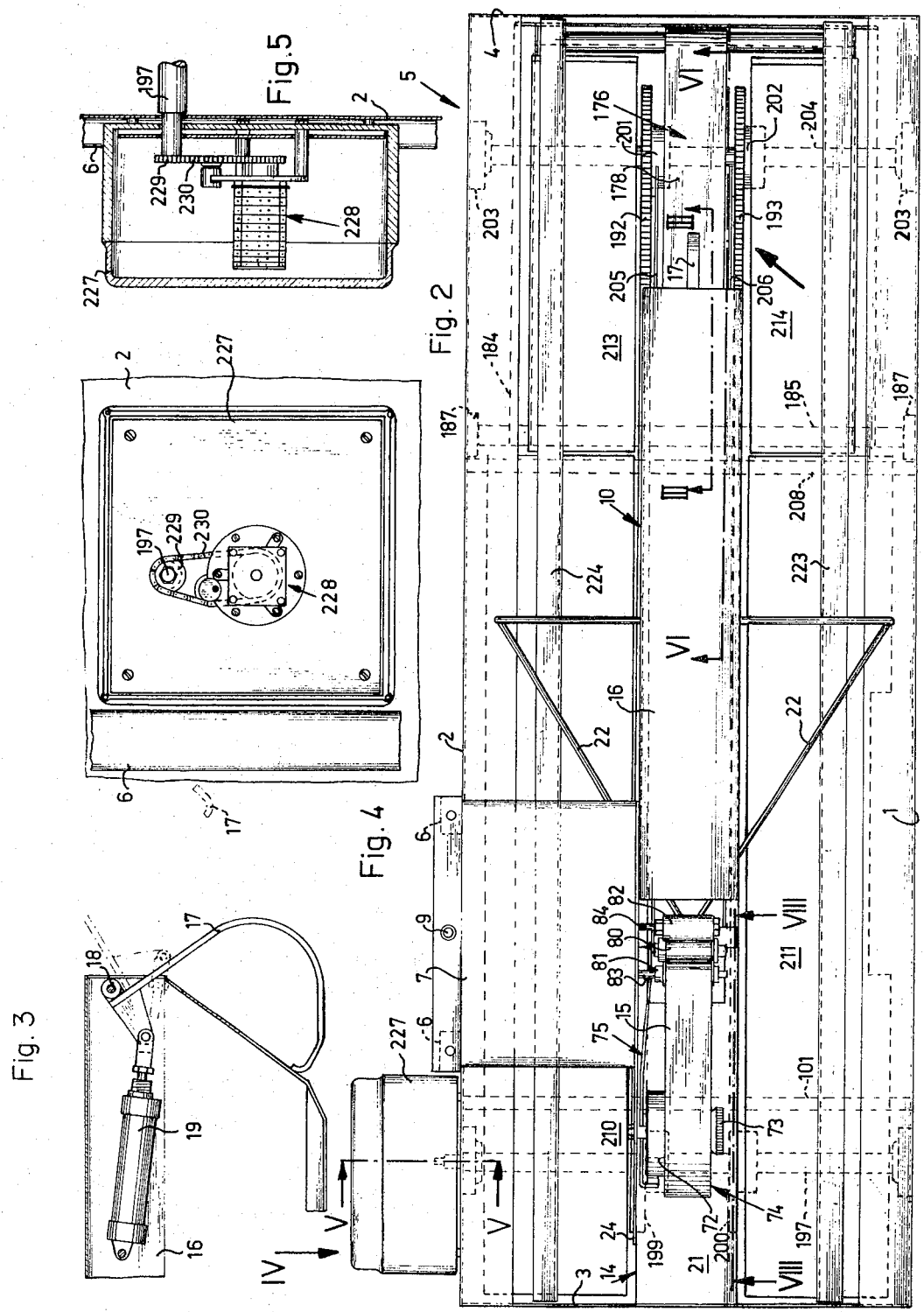

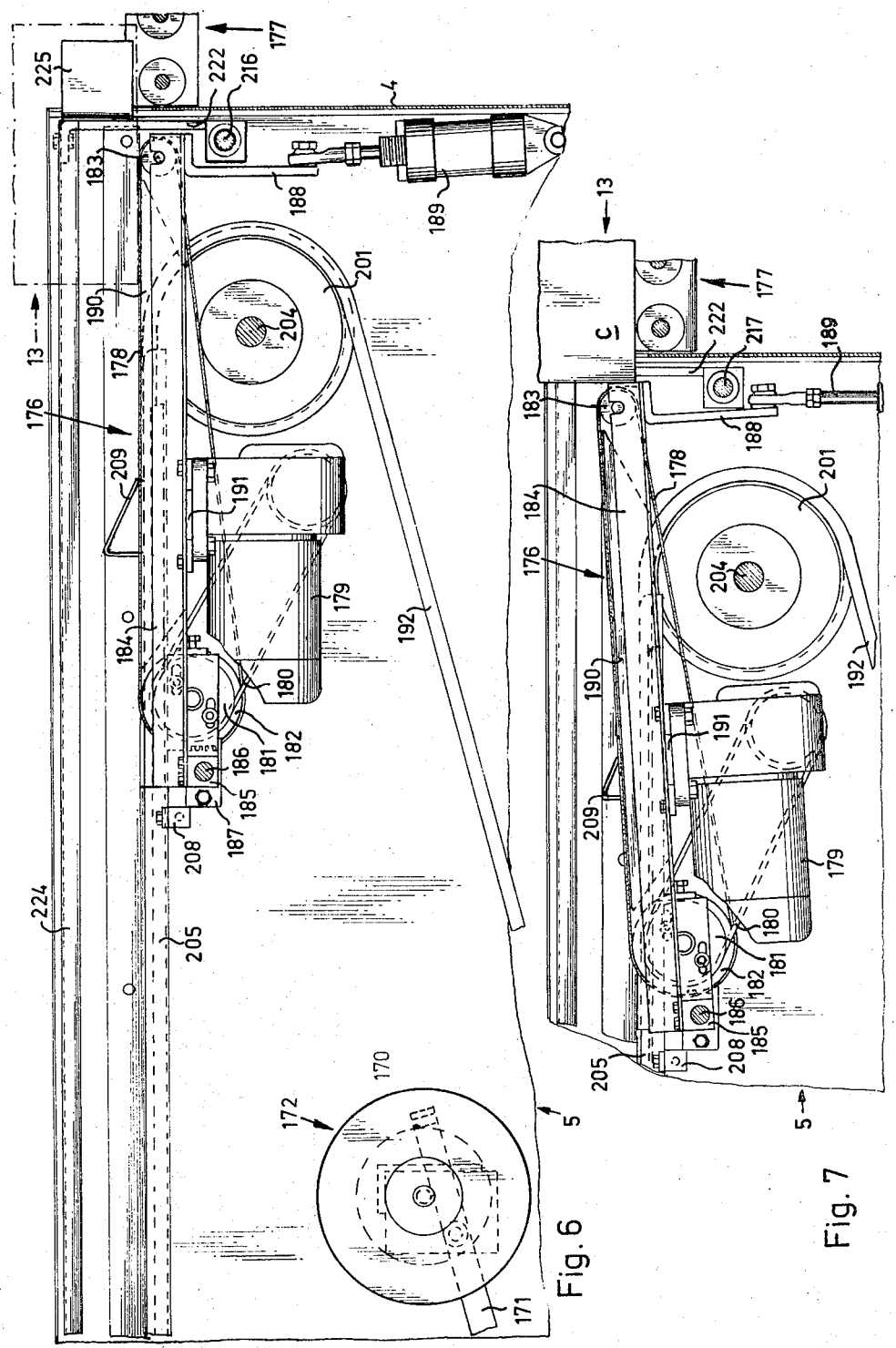

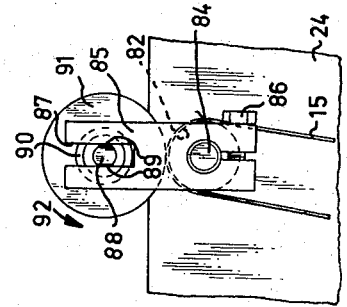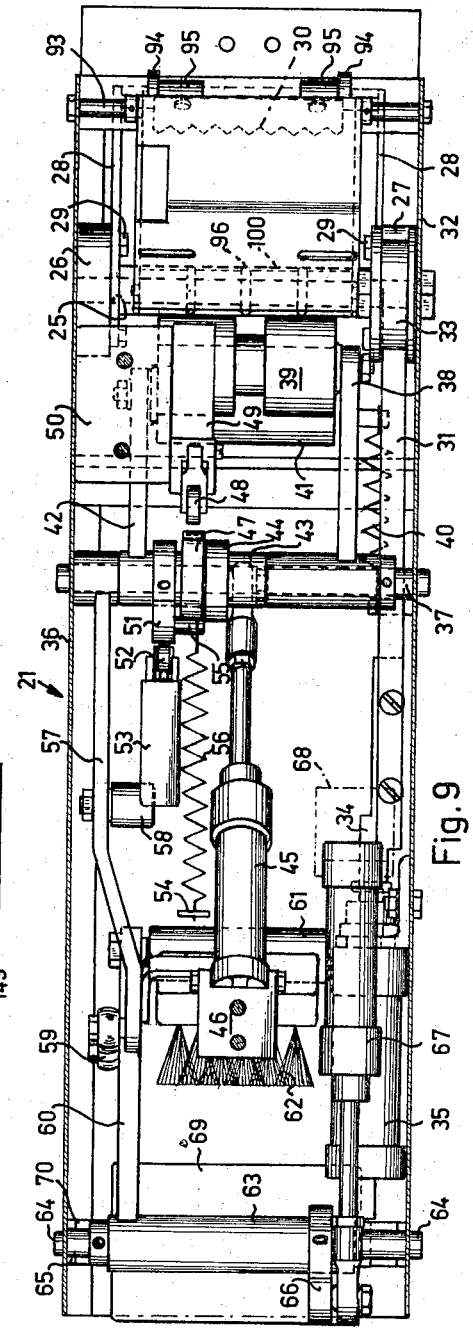

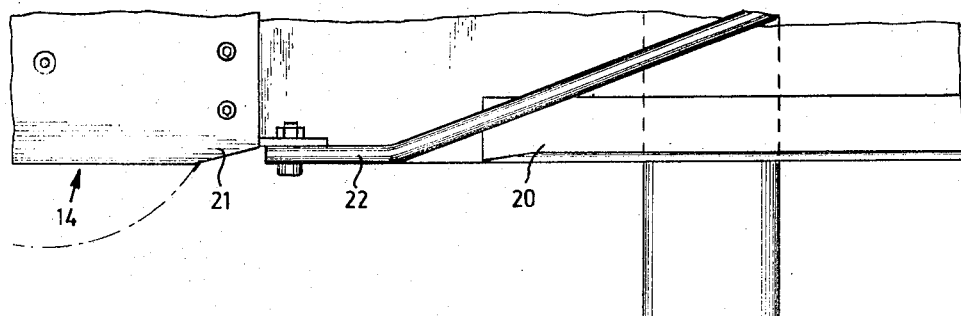
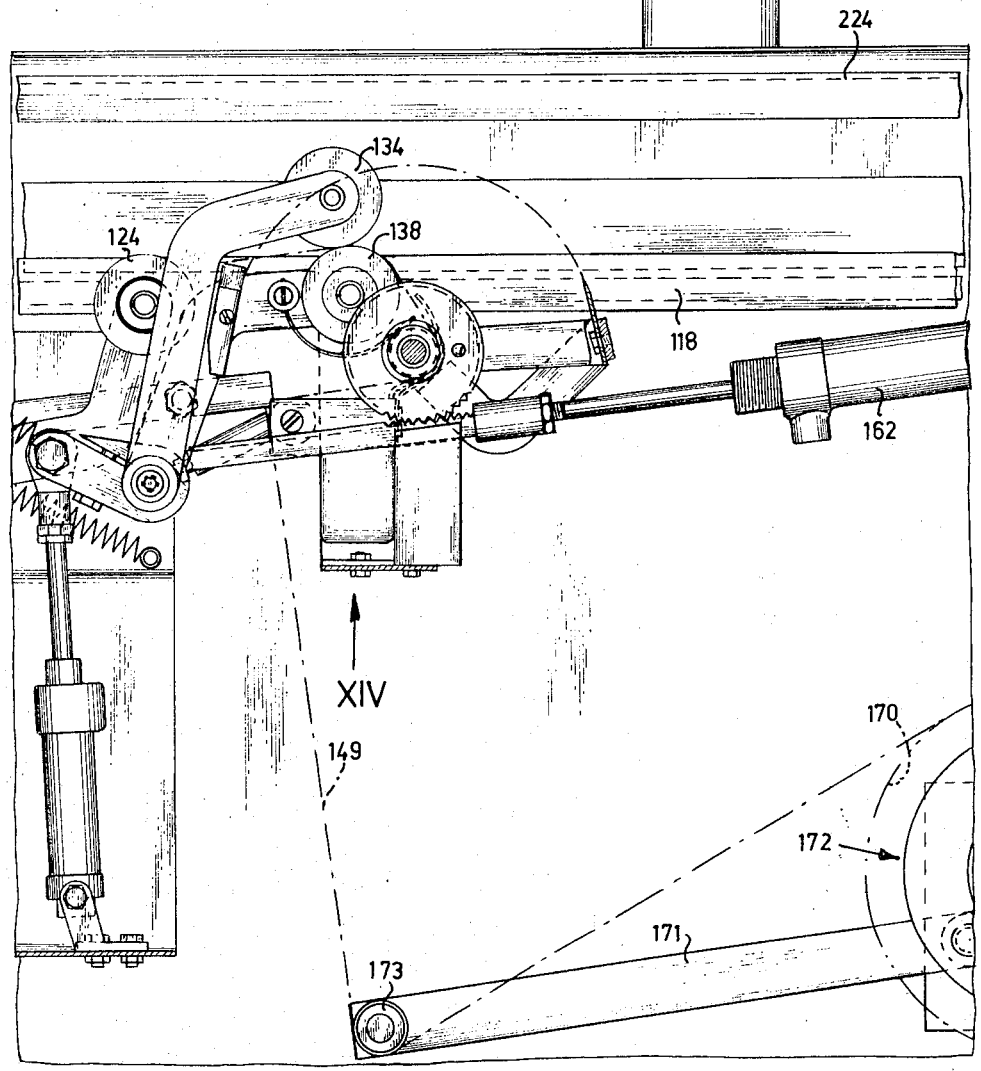
Fig.13

MACHINE FOR SEALING FOLDING CARTONS WITH ADHESIVE TAPE STRIPS

The invention concerns a machine for the automatic bending of the upper flaps of cartons and for closing the base and the top of the latter by applying adhesive tapes on the base and top as well as on a part of the adjoining end faces of the carton, these adhesive tapes being taken from a supply reel and activated by moistening.

Such machines or devices are already known. The packing material fed to such a machine consists of folding cartons which have a rectangular cross section and which are so cut that folding flaps are formed on each side wall at the top and bottom, the bottom folding flaps being so bent inward, before the packing is introduced into the machine for mechanical or manual filling, that the slit formed between the last bent-off flaps extends in the direction of feed of the carton. The prepared carton, with the upper folding flaps extending upward, is now introduced into the machine by hand or by a conveyer means, the upper flaps being at first bent inward by means of a lock hook and folding switches before the slits provided on the base and top are covered by means of adhesive tapes.

Various methods and machines or devices are known for applying an adhesive tape on filled boxes.

Thus, according to a known method, two boxes, which are spaced from each other in a certain distance, are joined by the same adhesive tape, after which this tape is cut between the boxes, and the resulting free ends of the adhesive tape are folded over and pasted on the box walls facing each other. The boxes are fed continuously and the cutting, folding and pressing of the adhesive tapes are effected between the boxes while the latter move. This requires, however, that the means necessary for these operations must also move with the boxes.

A machine is also known for applying adhesive tape on cartons which is provided with an endless conveyer belt for the continuous feeding of the cartons and which has a swivel blade holder which is held in rest position by a feeler sliding on the box. After the feeler has slid off the box, the blade holder carrying the blade is released and drops by gravity on the tape supply reel arranged behind the carton to sever it. The tape end is pressed on the box by means of a pivotally mounted roller.

Furthermore a machine for sealing cartons by means of an adhesive tape is known where the cartons, stacked with folded-in flaps in a magazine arranged in the machine, are removed individually by dogs arranged in equal intervals on a continuously revolving conveyer chain and are fed to the tape-severing device. The adhesive tape is cut between two adjoining cartons and pressed by means of pressing parts on the side walls of the carton facing each other, and is applied by means of a moving brush on the underside of the carton. This machine can only work properly if there is always a supply of cartons in the magazine. Individual cartons can thus not be sealed with this known machine.

A device is also known for applying adhesive tape on filled boxes where two boxes, aligned in a row, are moved in a certain distance from each other past one or several stationary reels with adhesive tape. Here a reciprocating conveyer device with two pairs of dogs which are arranged spaced from each other and which are under spring tension, serve to feed the boxes in steps. In this device is also provided a positively controlled blade for cutting and folding the adhesive tape, rollers being mounted pivotally at both sides of the blade which are pressed away from the blade by springs.

The invention is based on the problem of providing a machine of the above-mentioned type which is equipped with improved means for the automatic and controlled introduction of the filled cartons fed to the machine and which has improved application-, pressing-and cutting means to ensure a rapid passage of the carton through the machine.

This problem is solved according to the invention substantially in that, in addition to the conveyer means serving to conduct the cartons through the machine, a conveyer belt is provided which effects the feed of the cartons to the conveyer means and controls the introduction of the cartons into the machine. In a machine where the conveyer means moving the cartons through the machine consists of two dog-equipped conveyer chains extending parallel to each other and being driven by a common drive, the conveyer belt device can consist of a revolving inlet belt arranged between the conveyer chains, the belt-driving drum and the supporting roller being carried by a frame pivotally mounted in the machine. In addition, a lifting mechanism for the frame is provided to turn the latter so that its front edge arrives in the path of motion of the cartons to be introduced into the machine.

On the frame is secured a plate serving as a support for the inlet belt. It is also provided with sliding plates extending in the plane of the supporting plate to support the cartons. The belt-driving drum is driven by a motor which is carried by the swivel frame. The lifting mechanism for the frame can consist of a compressed air cylinder which can be controlled in dependence on the position of the dogs arranged on the conveyer chains.

The application means for the adhesive tapes have an upper pressure roller and a lower pressure roller, which can be operated by means of compressed air cylinders and which move from their starting positions in the path of motion of the carton into their operating positions against the pressure medium acting in the cylinders during the passage of the cartons.

The application means for the upper adhesive tape has also a pressure roller which can be pivoted by means of a double-action compressed air cylinder and which can be moved in dependence on the position of the upper pressure rollers from or into the path of motion of the cartons and into the operating position resp.

On the lever carrying the upper pressure roller and in operative connection with the double-action compressed air cylinder is arranged a pressing brush serving to press-on the upper adhesive tape in the range of the upper right edge of the carton. The double-action compressed air cylinder moving the upper pressure roller can be controlled by means of an air valve which is operated by a cam connected to a lever carrying the first mentioned upper pressure roller. There is also a one-arm lever provided, which is mounted for rotation about the pivot of this lever and which is articulated over an adjustable bar to the lever carrying the pressing brush and which has a roller projecting into the path of motion of the lever and acting as a dog.

The application means for the lower adhesive tape has, in addition to the above mentioned lower pressure roller, an additional lower pressure roller, which is rotatably mounted on a lever which can be pivoted against the action of a restoring spring and which is pressed, after it is passed over by a carton, by means of a compressed air cylinder on the applied adhesive tape.

The application mechanism for the lower adhesive tape has, in addition to the pressure rollers controlled by the said compressed air cylinders, two additional pressure rollers which are coupled with each other and which can be brought by the passing cartons into operating positions and which can be returned into their starting positions by means of a restoring spring after the passage of a carton.

One of the two pressure rollers is received by a rotatably mounted two-arm lever whose free arm is connected over a hinge rod to a one-arm lever carrying the other pressure roller in order to impart to the other lever an opposite movement when the first lever is turned.

The cutting mechanisms for cutting off the adhesive tapes necessary for sealing the cartons and taken from the tape supply reels have cutting blades which are mounted for pivotal movement about their axis. Compressed air cylinders are provided to swivel the cutting blade for cutting off the adhesive tapes, which effect the swivelling of the blades over racks and gear wheels connected to the blades.

For disconnecting the blades, with the machine idling, is provided a switch preventing the aeration of the compressed air cylinder controlling the blades, this switch being actuated by the lever carrying the above mentioned upper roller.

In order to prevent the withdrawal of the head ends formed during the severing of the adhesive band from the path motion of the cartons, return stops are provided for the adhesive tapes. The return stop for the upper adhesive tape can consist of a guide roller and a locking roller, bearing under its own weight on the tape, which is provided with a free wheel hub permitting the rotation of the locking roller only in one direction of rotation. The return stop for the lower adhesive tape can consist of a guide roller and of a pin pivoting about an axis, which bears under its own weight on the tape with a beveled end face.

An embodiment of the invention is shown by way of example in the drawing.

Figure 8:
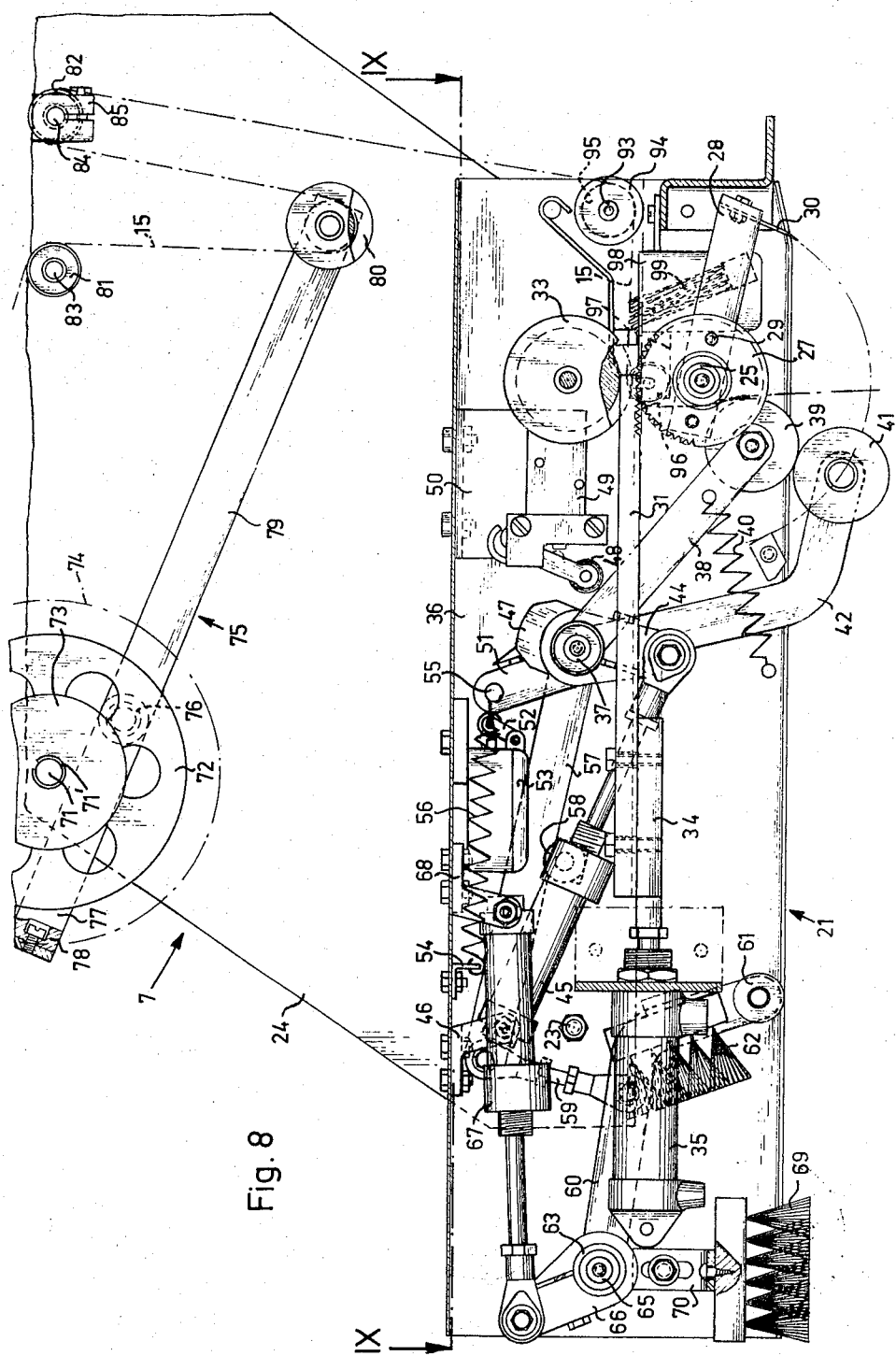
Figure 12:
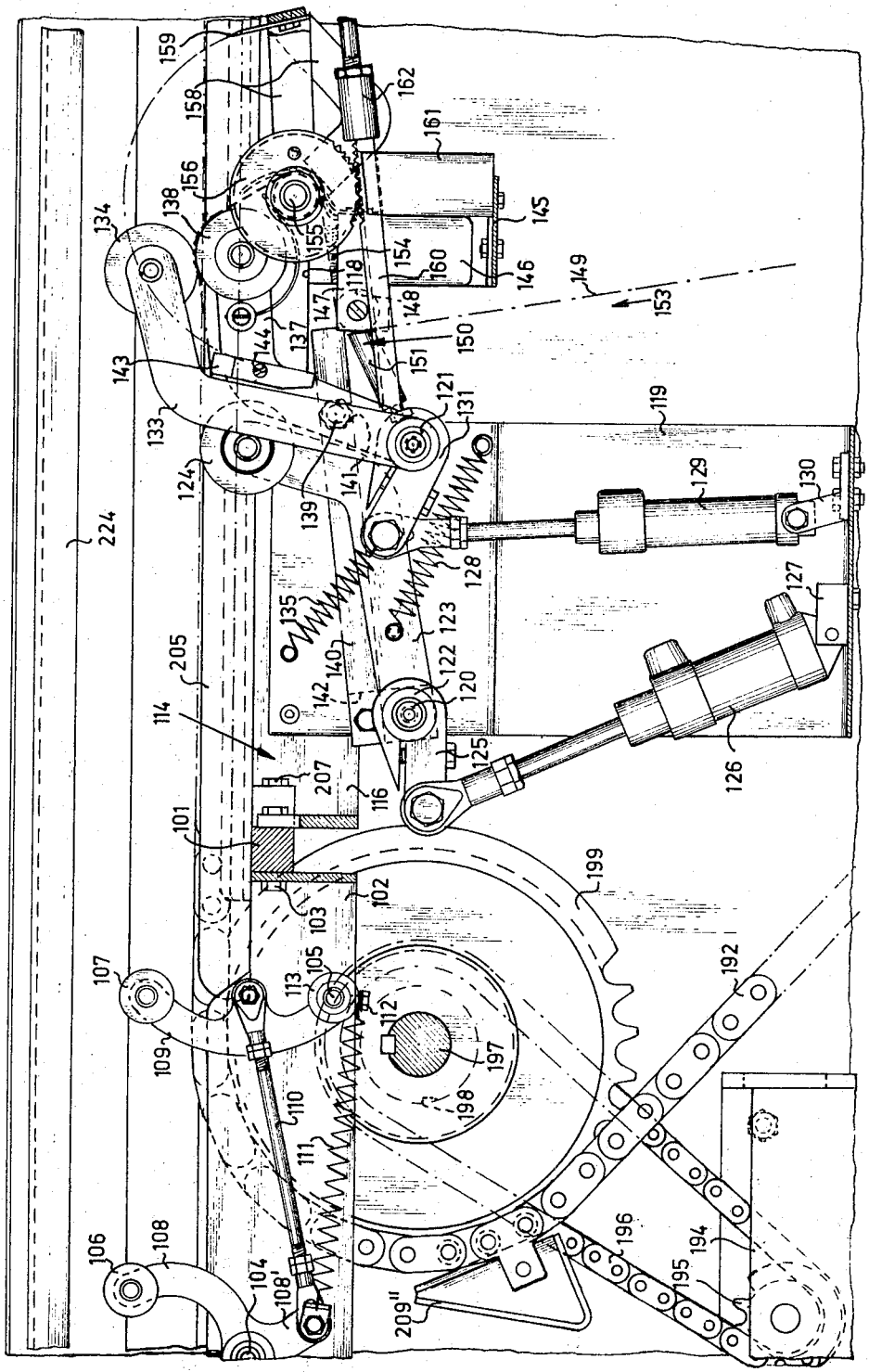
Figure 15:
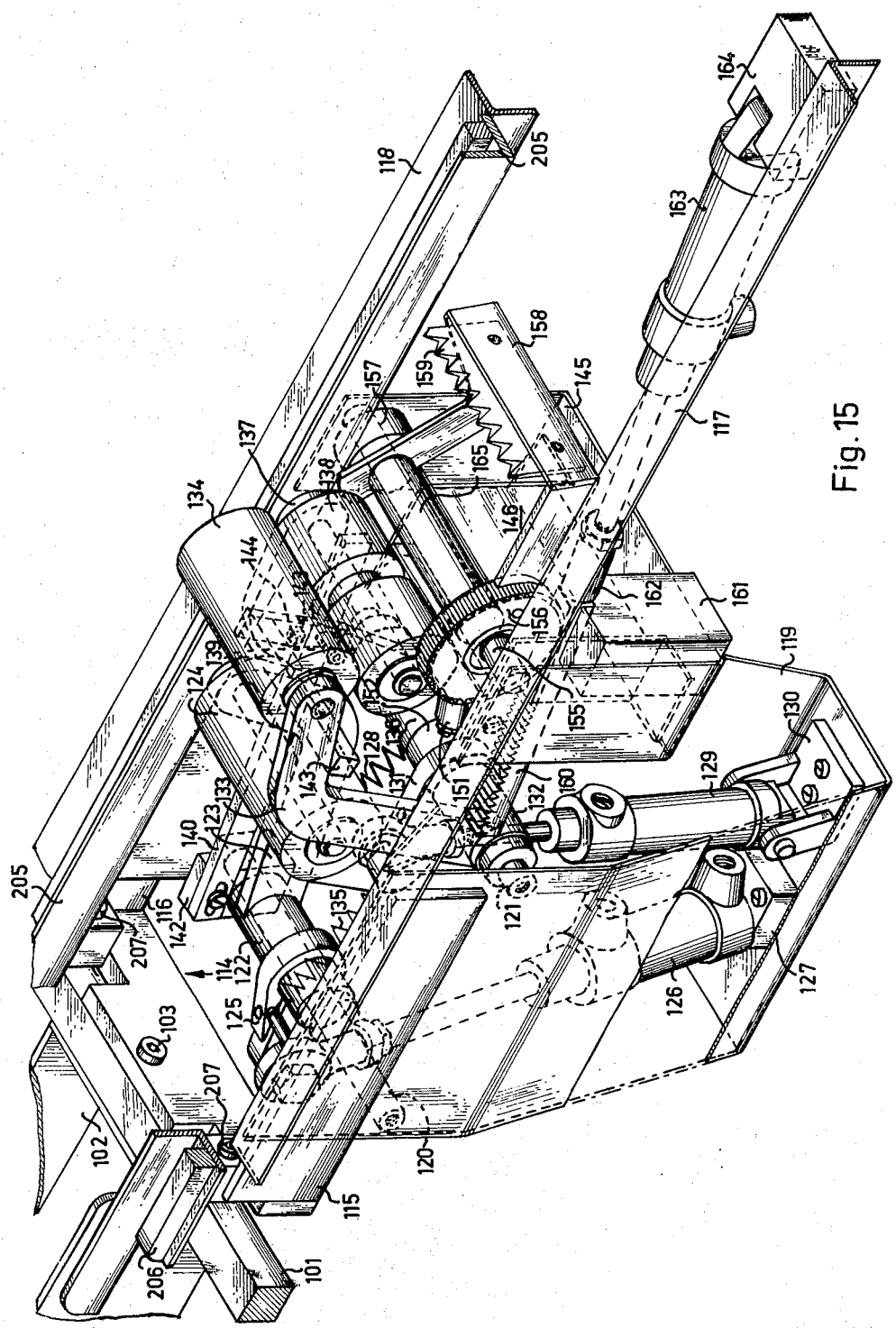
Figure 16:
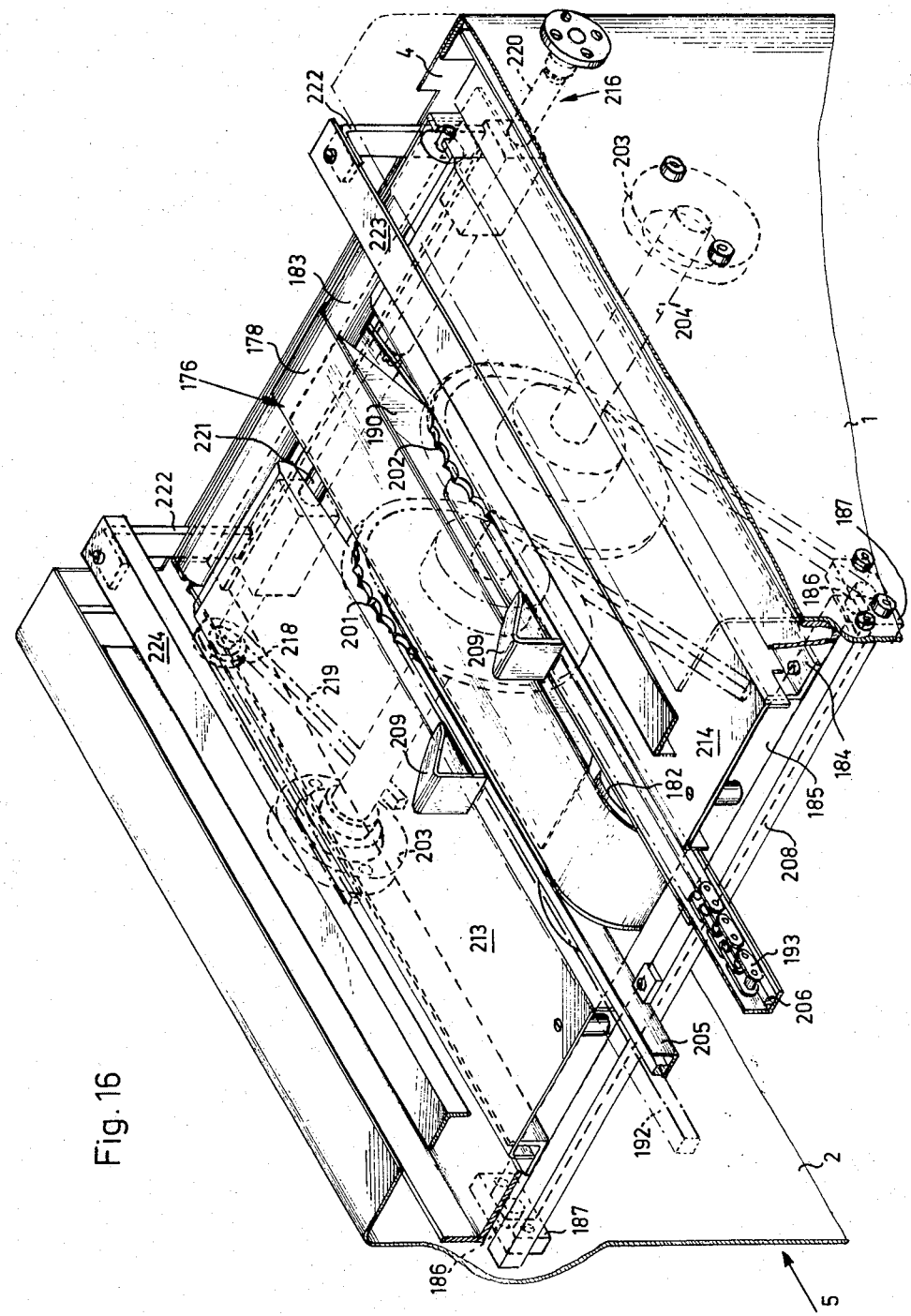

FIG. 1 shows the machine in a perspective view.
FIG. 2 shows a top view of the machine.
FIG. 3 shows a section substantially along the line III—III of FIG. 2.
FIG. 4 shows a view in the direction of the arrow IV of FIG. 2.
FIG. 5 shows a section along the line V—V of FIG. 2.
FIG. 6 shows a section along the line VI—VI of FIG. 2.
FIG. 7 shows a section corresponding to FIG. 6, but in a different operating position of the machine.
FIG. 8 shows a section along the line VIII—VIII of FIG. 2.
FIG. 9 shows a section along the line IX—IX of FIG. 8.
FIG. 10 and 10a to 10e show schematic representations of the operations taking place in the machine.
FIG. 11 shows a partial view in the direction of the arrow XI of FIG. 1 on an enlarged scale.
FIG. 12 shows a section along the line XII—XII of FIG. 1.
FIG. 13 shows a section corresponding to FIG. 12.
FIG. 14 shows a vertical section through a detail designated in FIG. 13 with an arrow XIV.
FIG. 15 shows a perspective top view of a part of the machine in the direction of the arrow XV in FIG. 1 on an enlarged scale and
FIG. 16 shows a perspective top view of a part of the machine in the direction of the arrow XVI of FIG. 2 on an enlarged scale.

On a base 5 consisting of a front wall 1 (FIG. 1 and 2), a rear wall 2, a left side wall 3, and a right side wall 4, are secured two vertical guide tubes 6. On the latter is guide displaceably a bracket 7 which can be raised and lowered by means of a threaded spindle 9 rotatably mounted in a bridge 8 arranged on the guide tubes 6.

The bracket 7 carries a flap closing mechanism 10 for folding the flaps 11, 12 of the carton 13 (FIG. 1) and an upper pasting-and cutting mechanism 14 for the upper adhesive tape 15.

The flap-closing mechanism 10 has an arm 16 which is secured on the bracket 7. At the end of the arm 16 is mounted a lock hook 17 for rotation about a bolt 18 (FIG. 3). By means of a first compressed air cylinder 19 the lock hook 17 can be turned into the position indicated by a broken line. On the arm 16 is also secured a press pad 20 (FIG. 1 and 3) whose free end bears on a box 21 of the upper pasting-and cutting mechanism 14 (FIG. 1 and 13). On the arm 16 and the box 21 are also secured by screws folding switches 22 (FIG. 1, 2 and 13) for folding the flaps 12.

The box 21 is secured by screws 23 (FIG. 8) on a plate 24 of the bracket 7. On an axle 25 arranged in the box 21 are rotatably mounted a flange 26 (FIG. 9) and a gear wheel 27 (FIG. 8 and 9). On the latter is secured by means of screws 29 a frame 28 which carries a blade 30. With the gear wheel 27 mesh the teeth of a rack 31 which is guided in a guide roller rotatably mounted on the front side wall 32 of the box 21. The rack 31 is joined by screws with an intermediate piece which is connected to the piston rod of a second compressed air cylinder 35 arranged on the side wall 32.

A lever 38, which carries a rotatable upper pressure roller 39, is mounted for rotation about an another axis arranged between the side walls 32, 36. The lever 38 is under the action of a tension spring 40. A second upper pressure roller 41 is rotatably mounted on a lever 42 which is provided with a hub 43 rotatably mounted on the axle 37 (FIG. 9). On the hub 43 is arranged a clamping lever 44 (FIG. 8 and 9), on which acts the piston rod of a third compressed air cylinder 45, which is pin-jointed bearing block 46 secured in the box 21. On the hub 43 is also secured a cam 47 which can cooperate with the actuating roller 48 of an air valve 49 which is secured over a retaining part 50 in the box 21. A second clamping lever 51, which cooperates with the control lever 52 of an electric contact switch 53, is secured on the hub 43. Between a spring eye 54 and a journal 55 arranged on the second clamping lever 51 is provided a tension spring 56.

On the axle 37 is also rotatably mounted a one-arm lever 57 which carries a loose roller 48 arranged in the swivel range of the lever 42 and which is articulated over an adjustable bar 59 to a lever 60. This lever 60 carries a third upper pressure roller 61 and a pressing brush 62. The hub 63 of the lever 60 is mounted for rotation about an additional axle 65 secured by means of screws 64 between the side walls 32, 36 of the box 21, and carries a clamping lever 66. On the latter is articulated the piston rod of a fourth compressed air cylinder 67, which is received in a bearing block 68.

On a stirrup 70 arranged between the side walls 32 and 36 is secured by screws a stationary pressing brush 69. On the plate 24 of the bracket 7 (FIG. 1, 2 and 8) is screwed another axle 71 on which is rotatably mounted a threaded pipe 71' on which are arranged a brake pulley 72 and a tightening nut 73, and which serves to receive an adhesive tape reel 74.

On the plate 24 is also mounted a brake lever 75 for rotation about a bolt 76 (FIG. 8), whose one arm 77 is bent off at one end and which carries a brake shoe 78 which can bear on the brake pulley 72, and whose other arm 79 carries a rotating tape reel 80. In addition, two guide rollers 81, 82 are provided for the adhesive tape 15 which are mounted for rotation about bolts 83, 84.

On the bolt 84 are secured two clamping pieces 85 by means of clamping screws 86 (FIG. 11, 1), which are provided with guide grooves 87 to receive an axle 88 which is provided at both ends with flat portions 89 which slide in the guide grooves 87 to prevent rotation of the axle 88. On the axle 88 is mounted a locking roller 91 provided with a freewheel hub 90 and a friction coat, which bears on the upper adhesive tape 15, as it can be seen from FIG. 11, and which can only be turned in the direction of the arrow 92.

Figure 10:
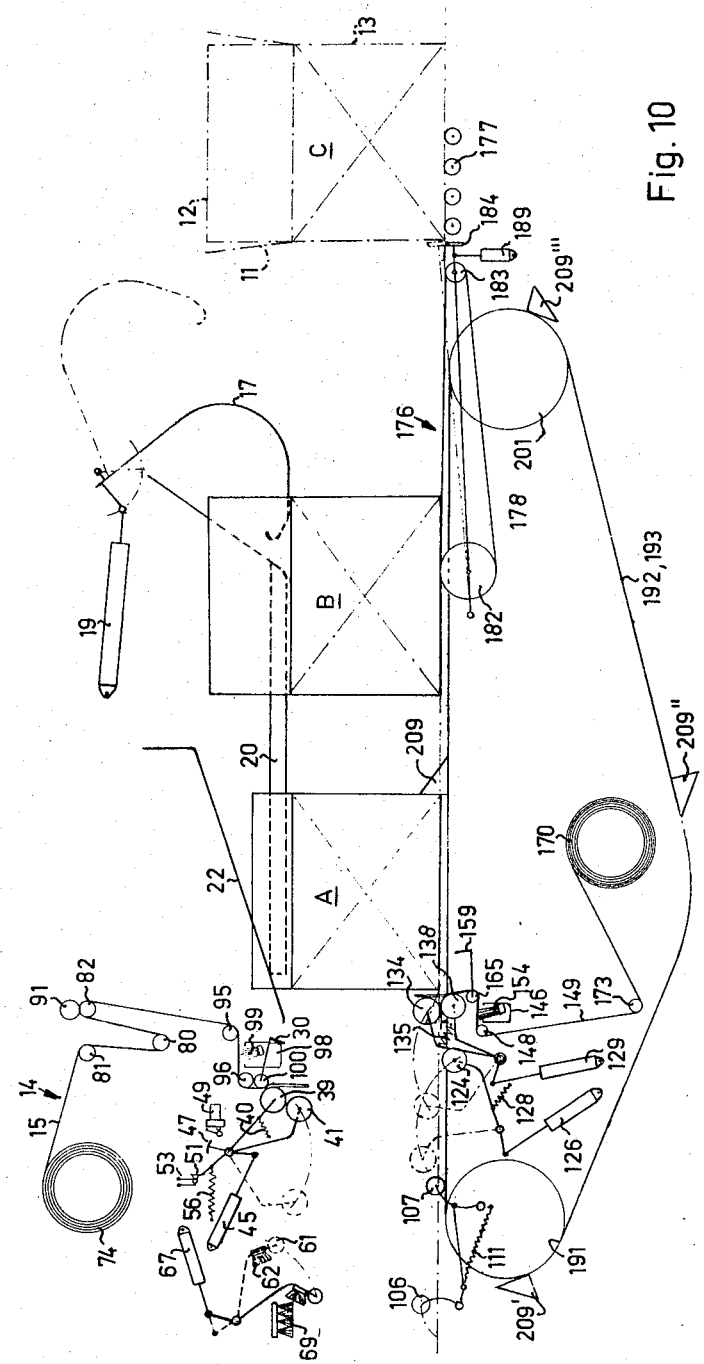
Figure 10:
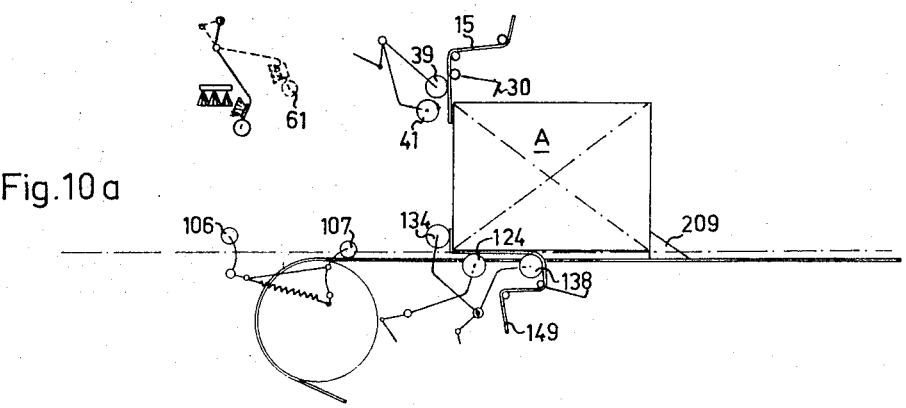
Figure 10:
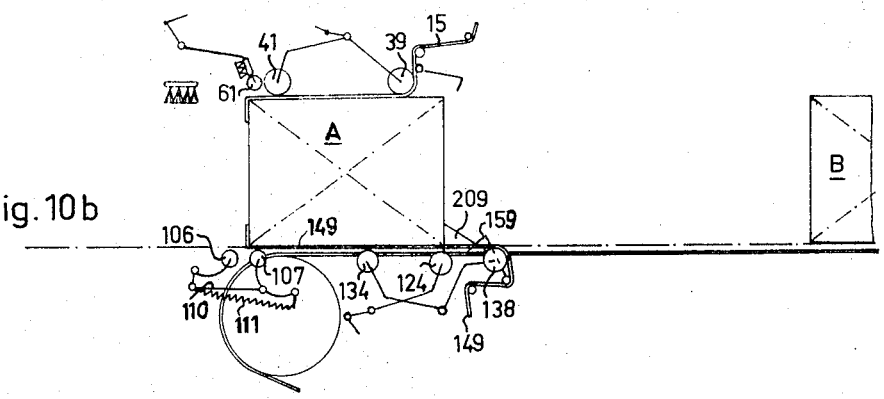
Figure 10:
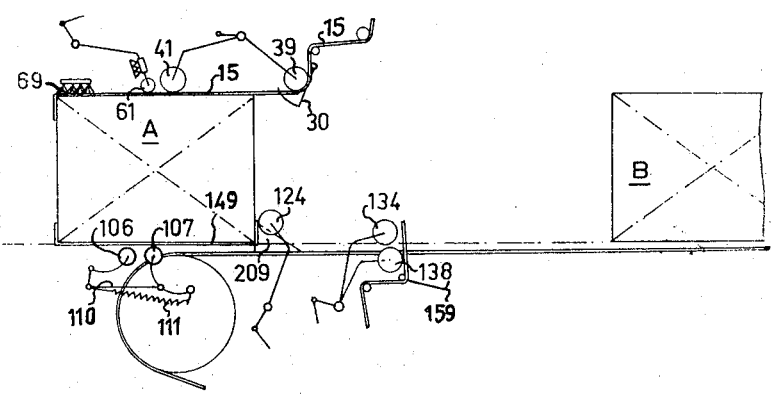

As it can be seen from FIG. 8 and 9, an axle 93 is provided in the box 21 on which are rotatably mounted two tape reels 95 provided with a cooler 94. An additional guide roller 96 is mounted in the arms 97 of a liquid tank 98 (FIG. 8) in which is inserted a brush 99 over which the adhesive tape 15 is conducted. Finally a roller 100 is rotatably mounted on the axle 25 (FIG. 10).

Between the two walls 1 and 2 of the base 5 is arranged a beam 101 (FIG. 1, 2, 21 and 15) on which is secured a frame 102 by means of a screw 103, whose shaft end face is joined by screws with the left side wall 3 of the base 5. In the frame 102 are mounted for rotation about bolts 104, 105 two levers 108, 109 provided with pressure rollers 106, 107 (FIG. 1 and 12). The lever 108 is a double-arm lever. On its arm 108' is secured a hinge rod 110 and one end of a tension spring 111. The free end of the rod 110 is articulated to the lever 109, while the other end of the tension spring 111 is engaged in a screw 112 which serves to fasten an adjusting ring 113 resting on the bolt 105.

On the beam 101 (FIG. 12 and 15) is likewise secured by means of the screw 103 a U-shaped frame 114 whose side walls 115, 116 are connected to two L-shaped longitudinal girders 117, 118 and a substantially U-shaped supporting frame 119.

Between the side walls of the supporting frame 119 are arranged two axles 120, 121. On the axle 120 is rotatably mounted a lever 123 provided with a hub 122, on the free end of which is rotatably mounted a first lower pressure roller 124. On the hub 122 is arranged a clamping lever 125 on which is articulated the piston rod of a fifth compressed air cylinder 126 which is mounted in a pivot bearing 127 arranged on the bottom of the supporting frame 119. A restoring spring 128 is arranged between the lever 123 and the U-shaped supporting frame 119.

A sixth compressed air cylinder 129, which is received pivotally in a bearing 130, is articulated with its piston rod to a clamping lever 131 which is clamped on the hub 132 of a lever 133 rotating about the axle 121. This lever 133 carries a second lower pressure roller 134. Between the clamping lever 131 and the supporting frame 119 is arranged a tension spring 135. On the axle 121 is also rotatably mounted another lever 137 provided with a hub 136 (FIG. 15), which carries a roller 138. On the lever 137 is screwed a journal 139 which engages a recess 141, open at the bottom, which is provided in a locking lever 140. The locking lever 140 can be displaced and locked on a bearing block 142 rotating about the axle 120. On the lever 137 is also secured a backstop 143 by means of a screw 144.

Between the two L-shaped longitudinal girders 117, 118 is arranged a support 145 (FIG. 14) into which the liquid tank 146 is inserted. The latter has side arms 147 to receive a rotating roller 148 over which the lower adhesive 149 runs. On the tape 149 and roller 148 resp. bears a journal 151 serving as a return stop 150, which is arranged on an adjusting ring 152 provided between the two hubs 132, 136 (FIG. 15) and rotating about the axle 121, and which bears with its bevel at the free end under its own weight on the tape 149. The return stop 150 has the effect that the tape 149 can only move in the direction indicated by the arrow 153. In the liquid tank 146 is inserted a lower brush 154.

For rotation about an axle 155 arranged between the longitudinal girders 117, 118 is mounted a gear wheel 156 and a flange 157 (FIG. 15) on which is secured a frame 158 which carries a lower blade 159. With the gear wheel 156 meshes a rack 160 (FIG. 12 and 15), which is guided in a guide plate 161 secured on the support 145. The rack 160 is connected over an intermediate piece 162 to the piston rod of a seventh compressed air cylinder 163 (FIG. 15), which is mounted in a bearing block 164 arranged on the longitudinal girder 117.

On the axle 155 is mounted a loose roller 165 for deflecting the lower adhesive tape 149 (FIG. 14). On this roller 165 bears a leaf spring 166 which is received in a slotted bolt 167 secured on the lever 137. Another leaf spring 168, which presses the adhesive tape 149 on the loose roller 165, is secured on the lower liquid tank 146 by means of screws 169.

The adhesive tape 149 (FIG. 13) arrives from an adhesive tape reel 170 which is received by a tape-unwinding mechanism 172 provided with a brake lever 171 (FIG. 6). The brake lever 171 carries in the same manner as the brake lever 75 described above a loose roller 173 over which the lower adhesive tape 149 runs. This tape-unwinding mechanism 172 is accessible through an opening 174 provided in the front wall 1 (FIG. 1), which can be closed by means of a plate 175 of transparent material, which can be hung into the opening 174.

As it can be seen from FIG. 1, 4, 6, 7, 10 and 16, the machine has an intake mechanism 176 for the cartons 13 fed from a roller track 177 (FIG. 1, 6, 7).

The intake mechanism 176 is provided with an endless inlet belt 178 which runs about a drum 182 and a supporting roller 183 driven by a geared motor 179

(FIG. 6, 7) over a V-belt 180 and a V-belt pulley 181. These parts are carried by a frame 184 which has a square axle 185 whose bearing pin 186 is rotatably mounted in bearing blocks 187 which are arranged on the walls 1 and 2 of the base 5. On the frame 184 is arranged an angle-plate 188 to which is articulated the piston rod of an eighth compressed air cylinder 189 which is arranged on the right side wall 4 of the base 5. The inlet belt 178 rests on a supporting plate 190 which is secured on a bracket 191 carrying the geared motor 179.

Parallel to the inlet belt 178 extend two endless coupling chains 192, 193 (FIG. 1, 2 16) which are driven by a motor 194 (FIG. 12) over a chain wheel 195, a chain 196, a chain wheel 198 secured on a shaft 197 mounted in the base 5, and the chain wheels 199, 200 secured on the shaft 197 carrying the coupling chains 192, 193.

The deflection of the coupling chains 192, 193 is effected by means of deflecting chain wheels 201, 202 (FIG. 2, 6, 7 and 16), which are wedged on a shaft 204 received in bearings 203 (FIG. 2 and 16). The rollers of the upper section of the coupling chains 192, 193 rest on chain guides 205, 206 (FIG. 1, 2, 12, 15 and 16) which are secured on the beam 101 by means of screws 207 (FIG. 12, 15) and which are screwed on an additional beam 208 (FIG. 2, 6, 7 and 16). Evenly distributed over the circumference of the chains 192, 193 are dogs 209, 209'', 209''' to engage the cartons 13 (FIG. 10).

It can be seen from FIG. 1, 2 and 3 that the sliding plates 210, 211, 212, 213 and 214 for the cartons 13 are arranged in the plane of the coupling chains 192, 193, the sliding plates 213 and 214 (FIG. 16) being secured on the swivel frame 184 of the inlet mechanism 176.

Nest to the left side wall 3 (FIG. 1) and the right side wall 4 (FIG. 6, 7 and 16) threaded spindles 216, 217 are rotatably mounted in the base 5. By means of a hand wheel 217 arranged outside the base 5 on the threaded spindle 215 (FIG. 1), the latter can be turned. The two threaded spindles 215 and 216 are connected with each other over chain wheels 218 (FIG. 16) and a roller chain 219, so that, when the threaded spindle 215 is turned, the threaded spindle 216 is turned with the same speed. Both threaded spindles 215, 216 have a portion 220 with a right-hand thread and a portion 221 with a left-hand thread, on which rest displacement parts 222, 222' provided with corresponding threads and upwardly extending arms (FIG. 1, 6, 7, 16). On the displacement parts 222, 222' are secured guide bars 223, 224 which serve as lateral guides for the cartons 13. In order to secure the entrance of the cartons 13, (FIG. 1, 6, 7), inlet plates 225, 226, bent off to the outside, are secured on the displacement parts 221, 222 arranged on the inlet side.

In a box 227 arranged on the rear wall 2 of the base 5 (FIG. 2,4,5) is housed the electric controller cylinder 228 for actuating the magnetic valves (not shown) controlling the compressed air cylinders, this controller cylinder 228 being driven by the shaft 197 over a chain wheel 229 and a chain 230.

The operation of the machine can be described as follows, using FIG. 10 and 10a to 10e as a basis.

The carton designated with "A" has been conveyed by the dogs 209 of the coupling chains 192, 193. On the way there, the flaps 11 have been bent inward by the press pad 20 and the lock hook 17 resp., and they are kept closed by the press pad 20, while the flaps 12 are folded to the inside by the folding switches 22. The left end wall of the carton A strikes the end of the lower adhesive tape 149 taken from the lower adhesive tape reel 170 and moistened by the brush 154 arranged in the lower liquid tank 146. At this time the compressed air cylinder 129 is aerated by a contact actuated by the controller cylinder 228 (FIG. 5) over a magnetic valve (not shown), this compressed air cylinder 129 being in operative connection with the lower pressure roller 134 which is in the path of motion of the carton A and under the action of the tension spring 135. The end of the adhesive tape 149 between the pressure roller 134 and the carton A is pressed on the end face of the carton A, and during its further movement the lower pressure roller 134 is pressed against the action of the tension spring 135 and the force produced by the compressed air cylinder 129 to the left in the path indicated by the broken line. The pressure roller 134 also rolls over the end of the lower adhesive tape 149, and additional tape is taken from the adhesive tape reel 170, which is pressed by the lower roller 138 on the underside of the carton A. Immediately after the carton A has struck the lower pressure roller 124, the compressed air cylinder 126 is aerated over the controller cylinder 228 (FIG. 5), which has the effect that the pressure roller 124 likewise presses the tape 149 on the underside of the carton A (FIG. 10a). During the further movement of the carton A, the lower pressure roller 134 also arrives on the underside of the carton A to exert a pressure on the tape 149, as shown in FIG. 10b. From this FIG. 10b it can also be seen that, when the right side wall of the carton A has reached the lower pressure roller 124, the lower blade 159 cuts the lower adhesive tape 149. This blade 159, which is operated by the compressed air cylinder 163 over the rack 160 and the gear wheel 156 (FIG. 15), is controlled by the controller cylinder 228 driven by the shaft 197, as shown in FIG. 5, over a magnetic valve (not shown) in dependence on the position of the dogs 209, 209', 209'', 209'''.

The tape end now projecting on the carton A is folded by means of the lower pressure roller 124 about the lower right edge of the carton A and pressed on the latter (FIG. 10c), this roller 124 bearing on the carton A until it reaches the end position of the air cylinder 106 (FIG. 10). Then the cylinder 106 is vented so that the pressure roller 124 is returned under the action of the restoring spring 128 into its starting position represented in FIG. 10. After passing over the lower pressure roller 134 (FIG. 10b), the latter is also returned to its starting position by the constantly aerated compressed air cylinder 129 (FIG. 10c).

Figure 10D:
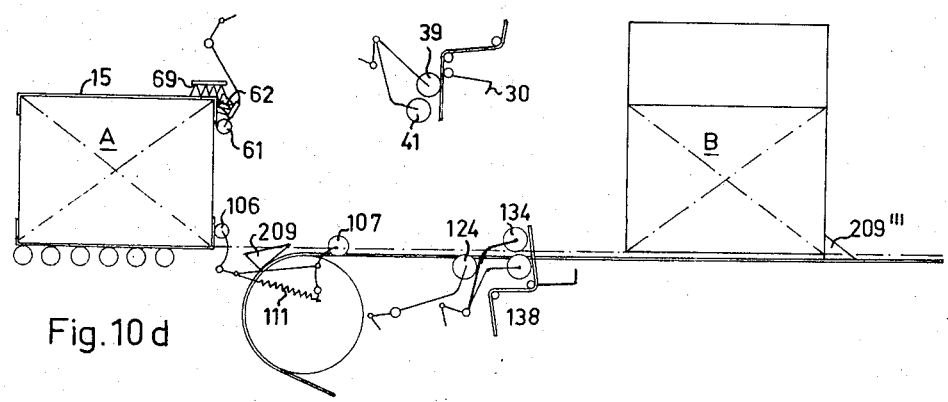
Figure 10E:
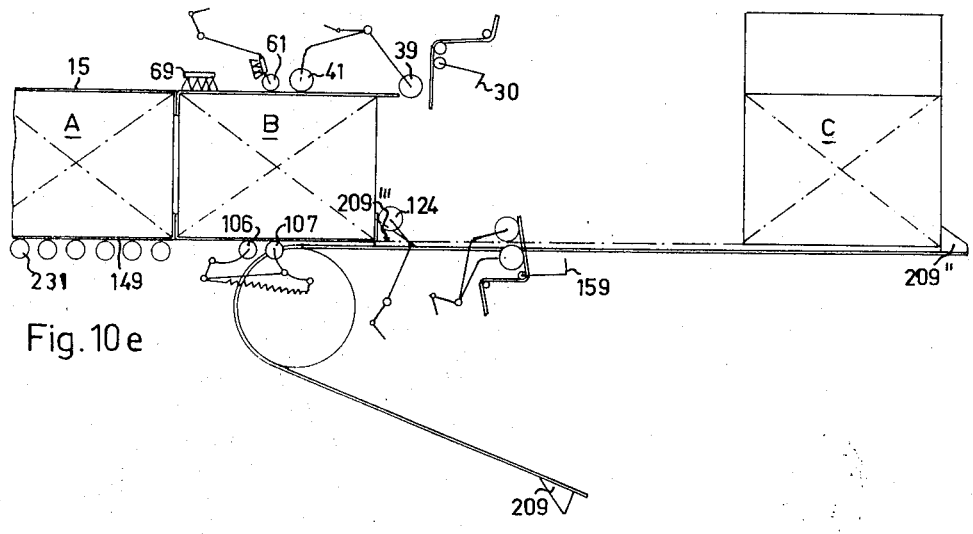

During the feed of the carton A, the pressure roller 107 arranged in the path of motion of the carton A bears on the adhesive tape 149 arranged on the end face of the carton A and arrives subsequently on its underside (FIG. 10b) to press on the tape under the action of the tension spring 111. Due to the hinged connection 110 between the pressure rollers 106, 107, the pressure roller 106 is also turned out of the path of motion of the carton A, and thus bears likewise on the adhesive tape (FIG. 10c). After the pressure roller 107 is released by the carton A, it presses on the tape end already cut off and pressed by the lower pressure roller 124 on the end face of the carton (FIG. 10d). As it can be seen from this figure, the restoring spring 111 has the effect that, after the dog 209 is separated from the carton A, the latter is pushed so far over the pressure roller 106, until the pressure rollers 106, 107 have reached their starting positions.

The upper adhesive tape 15 can be applied on the carton A as follows:

As it can be seen from FIG. 10, the upper adhesive tape 15, taken from the tape reel 74 and moistened by the brush 98 arranged in the liquid tank 98, hangs into the path of motion of the carton A. It bears on its left end face when the lower adhesive tape 149 (FIG. 10a) has already been applied halfway on the underside of the carton A. The tape 15 is first pressed by the upper pressure roller 41 on the left end face, and the compressed air cylinder 45 is aerated over a controller cylinder 228 and a magnetic valve (not shown), which has the effect that the roller 41 is pressed with relatively great pressure on the adhesive tape 15.

After the pressure roller 41 has arrived on the top side of the carton A (FIG. 10b), the compressed air cylinder 67 is aerated over the air valve 49 to move the upper pressure roller 61 (FIG. 10b) out of the path of motion of the carton A. After the tape 15 has been severed from the tape reel 74 (FIG. 10), the upper pressure roller 41 leaves the carton A and is returned to its starting position. The compressed air cylinder 67 is aerated in opposite direction over the air valve 49, so that the roller 61 bears under pressure on the tape 15 to press it on the right end face of the carton A (FIG. 10d). During this process the tape 15 is covered by the brush 62. The stationary pressing brush 69 covers during this time the adhesive tape 15 pressed on the top side of the carton.

The pressure roller 61 enhances furthermore the work of the lower pressure roller 106 insofar as it helps to push ahead the carton A released by the dog 209, to bring the roller 107 back into the path of motion of the carton.

The carton A is thus sealed by the adhesive tapes 15 and 149. The next carton B moved by the dog 209''' is now provided in the above described manner with adhesive tapes. As it can be seen from FIG. 10e, the carton B bears during the pasting process with its left end face on the right end face of the carton A and pushes the latter onto a roller track 231 connected to the machine.

The introduction of the cartons into the machine is effected by the controller cylinder 258 shown in FIG. 4 and 5 in dependence on the positions of the dogs 209, 209', 209'' and 209''' arranged on the coupling chains, 192, 193. A carton C standing on the roller track 177 arranged outside the machine (FIG. 10 and 1) is prevented by the front edge of the frame 184, turned by the compressed air cylinder 189 into the path of motion of the carton, from entering the machine so long until the dog 209''', for example (FIG. 10) starts to guide the carton B. At this time the frame 184 of the intake mechanism 176 is lowered, and remains in this position so long until the carton C has been moved by the inlet belt 178 into the position of the carton B.

In order to prevent damage to the carton or to the machine in case of failure of the control of the compressed air cylinder 67 (FIG. 8), for example, of the air valve 49, by the upper pressure roller 61, which is not moved out of the path of motion of the carton, the lever 42 can bear on the roller 58 arranged on the one-arm lever 57 when it is turned to the left, so that the lver 57 and also the lever 60 carrying the roller 61 over the adjustable bar 59 are lifted.

If cartons move through the running machine, the two blades 30 and 159 are disconnected for safety reasons. This is effected by the contact switch 53 (FIG. 8), which is held by the clamping lever 51 in a disconnected position and is only connected when a carton starts to turn the lever 42 carrying the roller 41. Until that time the contact switch 53 keeps the connection to the magnetic valves (not shown), which control the compressed air cylinders 35, 163, interrupted.

In order to keep the tape length constant, which is necessary for pasting on the left side walls of the carton, the return stop, 150 represented in FIG. 11 and 14 have been provided. These have the effect that the tape 149 (FIG. 14) can only be moved in the direction of the arrow 153, while it is prevented from withdrawing in the opposite direction by the wedge effect of the journal 151, and that the locking roller 91 (FIG. 11) can only turn in the direction of the arrow 92, due to its support on a freewheel hub 90, and the tape 15 can likewise be drawn off in only one direction.

I claim:

1. A machine for the automatic bending of the upper flaps of cartons and sealing of the bottom and top and part of the adjoining end faces of the carton, comprising, a machine frame, conveyor means for feeding cartons to the machine and for moving said cartons through the machine, including a pair of parallel spaced conveyor chains provided with dogs, drive means for driving said chains, an inlet belt arranged intermediate said conveyor chains, a swivel frame mounted in said machine frame, a belt-driving drum, and a supporting roller rotatably mounted in said swivel frame, means for moving said swivel frame into a path of movement of a carton introduced into said machine means for controlling the introduction of cartons into the machine, supply reels for adhesive tapes mounted on the machine, means for drawing off upper and lower adhesive tapes from said supply reels, application means for applying said adhesive tapes to said cartons, and cutting means for cutting off tape lengths.

2. A machine as claimed in claim 1, further provided with a supporting plate for said inlet belt secured to said swivel frame mounted in said machine frame, a pair of sliding plates arranged in the plane of said supporting plate and a motor mounted on said swivel frame for driving said belt-driving drum.

3. A machine as claimed in claim 1, wherein said means for moving said swivel frame includes a first compressed air cylinder and control means for said first compressed air cylinder, actuated by said dogs of said conveyor chains.

4. A machine as claimed in claim 1, wherein said application means consists of a first upper pressure roller and a first lower pressure roller, a pair of compressed air cylinders for operating said first upper and lower pressure rollers and for moving said rollers into the path of motion of cartons to be sealed.

5. A machine as claimed in claim 4, wherein said application means further consists of a second upper pressure roller carried on a first lever, a double action compressed air cylinder for rotating said second upper pressure roller, and movable from and into an operating position and the path of motion of a carton depending on the position of said first pressure roller, said first lever being operatively connected to said double action compressed air cylinder.

6. A machine as claimed in claim 5, wherein said first lever is provided with a pressing brush for pressing on an upper adhesive tape in a range of an upper right edge of a carton.

7. A machine as claimed in claim 5, wherein said application means further consists of an air valve for controlling the movement of said double action compressed air cylinder, a second lever operatively connected to said double action compressed air cylinder, and a cam connected to said second lever, for actuating said air valve.

8. The machine according to claim 7, wherein said second lever is provided with a pivot, a one-armed lever pivoted about said pivot, and adjustable bar articulating said one-armed lever to said first lever, and a driver roller projecting in the path of motion of said first lever.

9. A machine as claimed in claim 1, wherein said application means further consists of a second lower pressure roller for said lower adhesive tape, a second lever carrying said second lower pressure roller, a second lower compressed air cylinder linked to said second lever, for pressing said second lower pressure roller against said lower adhesive tape and said carton, and a restoring spring for retracting said lever and said second lower pressure roller into the normal position.

10. The machine as claimed in claim 4, wherein said application means further consists of an auxiliary pair of lower pressure roller means including a two-armed lever carrying one of said auxiliary rollers and pivoted on said machine, a one-armed lever carrying the other of said auxiliary rollers and pivoted on said machine, a hinge rod linked to the free arm of said two-armed lever and said one-armed lever, for causing opposite movements of said connected levers by a passing carton, and a restoring spring for returning said auxiliary rollers into the starting position after the passage of a carton thereover.

11. The machine as claimed in claim 1, wherein said cutting means comprises an upper cutting blade, a lower cutting blade, upper and lower axles for pivotting said upper and lower cutting blades, upper and lower compressed air cylinders rack and gear means for operatively connecting said air cylinders with said upper and lower cutting blades respectively for rotating said cutting blades, and switch means for disconnecting said cutting blades when the machine is idle, for preventing an aeration of said compressed air cylinders, said switch means being actuated by said application means for applying said adhesive tapes to said cartons.

12. The machine according to claim 1, further comprising return stops for said upper and lower adhesive tapes to prevent a withdrawal of head ends formed by cutting off the tapes, said return stop for said lower adhesive tape consisting of a lower guide roller, and a journal pivoted on an axle and bearing with its bent end face on the tape under its own weight.

* * * * *